United States Patent
Fugate et al.

(10) Patent No.: US 8,732,366 B2
(45) Date of Patent: May 20, 2014

(54) METHOD TO CONFIGURE SERIAL COMMUNICATIONS AND DEVICE THEREOF

(75) Inventors: Kevin R. Fugate, Madison, MS (US); Edward W. Carstens, Madison, MS (US); Jordan P. Legendre, Ridgeland, MS (US)

(73) Assignee: Freescale Semiconductor, Inc., Austin, TX (US)

( * ) Notice: Subject to any disclaimer, the term of this patent is extended or adjusted under 35 U.S.C. 154(b) by 74 days.

(21) Appl. No.: 13/459,545

(22) Filed: Apr. 30, 2012

(65) Prior Publication Data

US 2013/0290577 A1    Oct. 31, 2013

(51) Int. Cl.
*G06F 13/00*    (2006.01)
(52) U.S. Cl.
USPC .............................. 710/104; 327/18
(58) Field of Classification Search
USPC .............................. 710/104, 305–306; 327/18
See application file for complete search history.

(56) References Cited

U.S. PATENT DOCUMENTS

| | | | | |
|---|---|---|---|---|
| 4,053,717 | A | * | 10/1977 | Snider ........................... 455/462 |
| 4,939,396 | A | * | 7/1990 | Schoettmer ..................... 327/18 |
| 2002/0108011 | A1 | | 8/2002 | Tanha |
| 2010/0169534 | A1 | * | 7/2010 | Saarinen et al. ............... 710/316 |

OTHER PUBLICATIONS

NXP, "SC161S850L, Single UART with I2C-bus/SPI Interface, 129 bytes of Transmit and Receive FIFOs, IrDA SIR Built-in Support," NXP Product Data Sheet, Rev. 1; Jul. 22, 2011; 60 pages.
Analog Devices, "ADT7411: SPI-/I2C -Compatible, 10-Bit Digital Temperature Sensor and 8-Channel ADC," Analog Devices, Inc. Product Data Sheet; Rev. B; 2006, 36 pages.
ST Microelectronics, "LIS3L02DQ: MEMS Inertial Sensor: 3-Axis-+ Digital Output Linear Accelerometer," ST Microelectronics Product Data Sheet' Rev.4; May 2005; 20 pages.

* cited by examiner

*Primary Examiner* — Clifford Knoll (57) ABSTRACT

In response to a reset condition, the state of a steady-state signal at an I/O pin of the serial communication port of an integrated circuit die is determined. The serial communication port is configured to support one of the plurality of serial communication protocols based upon the detected steady-state condition.

20 Claims, 6 Drawing Sheets

| STEADY STATE AT PIN 113 | CMP_H / CMP_L | SEL FUNCTION |
|---|---|---|
| HIGH | 0 / 0 | I2C |
| LOW | 1 / 1 | I2C |
| HI-Z | 1 / 0 | SPI |

METHOD TO CONFIGURE SERIAL COMMUNICATIONS AND DEVICE THEREOF

FIELD OF THE DISCLOSURE

The present disclosure relates generally to devices using serial communications.

BACKGROUND

Many different types of serial buses are used today to provide communications between data processing devices. Two example serial buses include the $I^2C$ (I2C) bus, also referred to as the inter-IC bus, developed by Phillips Semiconductor and the Serial Peripheral Interface (SPI) bus developed by Motorola, Inc. The I2C bus is a half-duplex two-wire synchronous data transfer serial bus and is used widely as a control and diagnostic bus. The I2C bus is a multi-master bus and thus can be controlled by more than one connected integrated circuit (IC). A slave device connected to an I2C bus is associated with an I2C slave address, which is unique to the system in which it resides, and monitors I2C transmissions over the I2C bus to determine whether or not it is the intended recipient of a particular communication.

The SPI bus is a full-duplex four-wire, synchronous data transfer serial bus. In slave mode, data transfers are synchronized by a shift clock from an SPI master device and can occur at frequencies up to that of the internal clock of the SPI master. In addition to the four-wire SPI bus, there are also three-wire variations of the SPI bus. According to one three-wire variation, the SPI bus operates as a half-duplex bus, wherein one of the data communication lines is not implemented. Another three-wire variation of the SPI bus omits the use of the chip select wire in applications where one SPI device is always selected as a slave SPI device.

The many choices amongst serial communication buses have resulted in some electronic devices having to support more than one bus in order to service a wider market.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

An embodiment of a data processor is disclosed that upon reset determines the state of a steady-state signal, and configures a serial communications port to implement one of a plurality of serial communication protocols based upon the determined steady state. In one embodiment, the data processor will configure a serial communications port as an SPI port when a HI-Z signal state is detected, or as an I2C port when either a logic HIGH or logic LOW signal state is detected.

An embodiment of a system includes a first data processor device having a serial communication port that supports a particular serial communication protocol. The first data processor's serial communication port is connected to a serial communication port of a second data processor device, wherein the serial communication port of the second data processor is capable of being implemented to support a plurality of serial communication protocols, including the particular serial communication protocol of the first data processor. In response to a reset condition, a steady-state signal at an Input/Output (I/O) pin of the second data processor's serial communication port is evaluated to determine which one of a plurality of steady-state signals is present at the I/O pin. Based upon the detected state at the I/O pin, the serial communications port of the second data processor is configured to one of the plurality of serial communication protocols. In particular, the serial communication port of the second data processor will be configured to the same communication protocol as that supported by the first data processor device. A particular implementation of the present disclosure will be better understood with respect to FIGS. 1-11.

Figure 1:
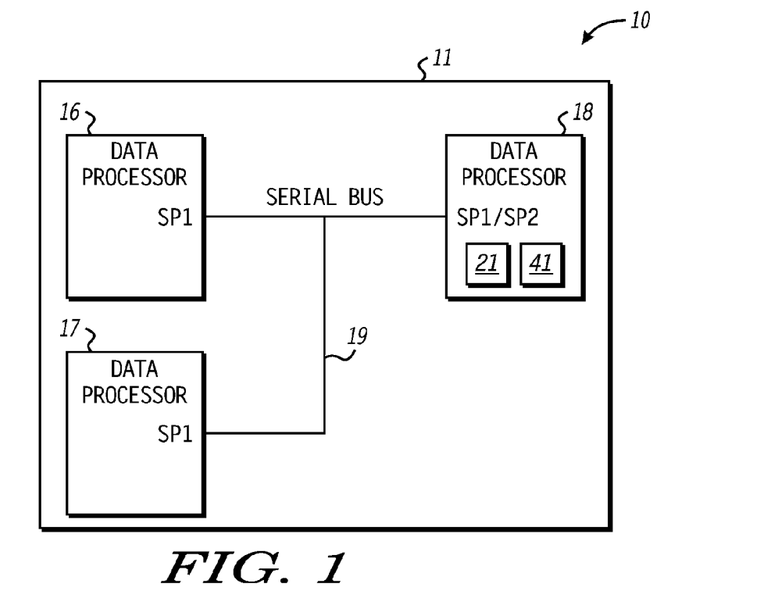
FIG. 1 is a block diagram illustrating system device in accordance with a specific embodiment of the present disclosure.

FIG. 1 illustrates a portion of system 10 that includes an electronic device 11 in accordance with a specific embodiment of the present disclosure. System 10 is a device that can be a portable or non-portable system. Examples of portable and non-portable systems can include consumer goods, such as consumer electronics and durable consumer goods. In one embodiment, the system 10 can represent an automobile, a printed circuit board having one or more an integrated circuits as disclosed herein, a handheld computing device, a personal computer, a computer server, or components within any of these types of systems.

The electronic device 11 is illustrated to include multiple integrated circuits connected to one another by a common serial bus 19. The multiple integrated circuits include a data processor 16, a data processor 17, and a data processor 18. In accordance with a specific embodiment of the present disclosure, each of the data processors 16-18 is presumed to be a separate processing device. For example, each of the data processors 16-18 can be a packaged integrated circuit die, separate integrated circuit die that are attached to a common substrate, and the like. In addition, each of the data processors 16-18 include logic as needed to communicate over the serial bus 19, which can be implemented by include instruction-based processors, state machines, and the like. In addition, two or more of the data processor devices 16-18 can be connected together using other interconnects, connected to other I/O pins.

The data processor 16 is illustrated to include a set of I/O pins, labeled SP1, that are also referred to in combination as serial bus port SP1. A serial communication module of the data processor 16 (not shown) implements a specific serial communication protocol at serial bus port SP1. The data processor 17 is illustrated to include the same type serial bus port (SP1) as data processor 16, and therefore includes a serial communication module (not shown) that implements the same specific serial communication protocol as data processor 16. The data processor 18 is illustrated to include a set of I/O pins labeled SP1/SP2 that are referred to in combination as serial bus port SP1/SP2 or as serial port SP1/SP2. The serial bus port SP1/SP2 can be configured to implement either the serial communication protocol associated with serial bus port SP1, which is implemented at the data processor 16, or to implement a different serial communication protocol associated with a serial bus port referred to herein as SP2. By way of example, data processors 16 and 17 are presumed to be capable of only supporting serial communications protocol associated with serial bus port SP1, and processor 18 is presumed be capable of supporting a plurality of serial communications protocols, including a serial protocol associated with port SP1 and a different serial protocol associated with serial bus port SP2. It will be appreciated, that the two different communication protocols can be any two serial protocols that transmit data serially over one or more I/O pin of their respective serial bus ports.

Depending on the specific serial communication protocol implemented at port SP1, each of the data processors 16, 17 can operate in one of the following modes with respect to the serial bus 19: master-only mode; slave-only mode; or in either master mode or slave mode. By way of example herein, data processor 16 is presumed to be a master-only device, and therefore operates only in master mode, while devices 17 and 18 are presumed to be slave-only devices, and therefore only operate only in slave mode.

According to the specific embodiment described herein, it is presumed that serial communication protocol associated with the SP1 port is one of either the I2C protocol or the SPI protocol, and that the serial communication protocol associated with the SP2 port is the other one of the I2C protocol or the SPI protocol. For example, the port labeled SP1 can represent an I2C port, while the port labeled SP2 represents an SPI port. It will also be appreciated that the concepts described herein can apply to other serial communication protocols.

Figure 2:
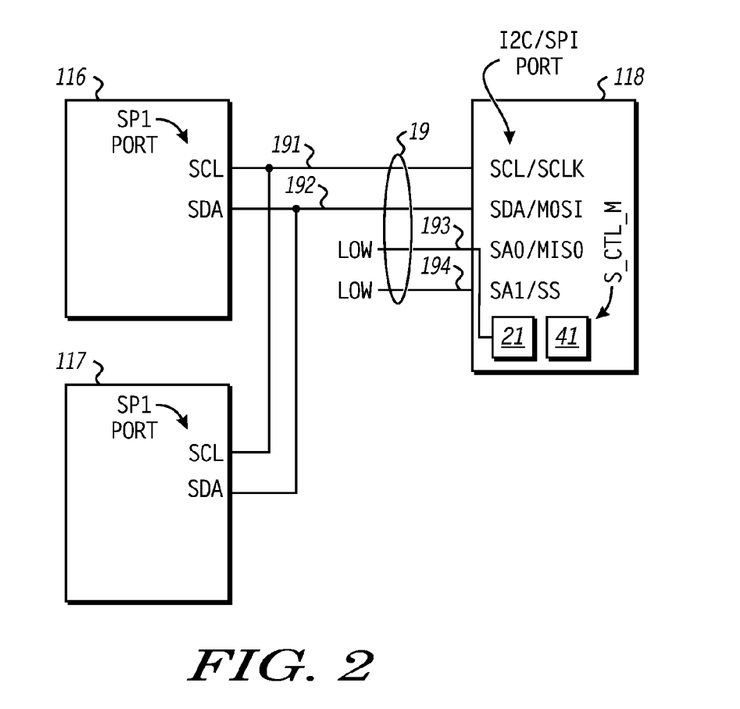
FIG. 2 illustrates a particular embodiment of the system device of FIG. 1.

FIG. 2 illustrates a particular embodiment of the present disclosure, including data processors 116-118 that correspond to particular embodiments of data processors 16-18 of FIG. 1. Data processor devices 116, 117 are illustrated to support only the I2C protocol, and therefore include I/O pins labeled SCL and SDA, which is consistent with the I2C protocol. Data processor device 118 is illustrated to support either the I2C protocol or the SPI protocol, and therefore includes I/O pins labeled SCL/SCLK, SDA/MOSI, SA0/MISO, SA1/SS, which is consistent with both the I2C and SPI protocols, wherein signal received at I/O pins SA0 and SA1 indicate two bits of the I2C slave address of device 18, when configured in I2C mode, as will be discussed in greater detail below.

As used herein: the term "I/O pin" is intended to refer to a conductive feature of an electronic device that provides an interface between the electronic device and an external media. Examples of I/O pins, include bonding pads of an integrated circuit die, probe pads of an integrated circuit die, package pins of a packaged integrated circuit, and the like, which can include surface mount pins, non-surface mount pins, and the like. The term "I/O pin" is further intended to refer to either an "input pin", an "output pin", or a "bidirectional pin". The term "input pin" is intended to refer to a pin of a device that is intended to only receive information from an external interconnect relative the device; the term "output pin" is intended to refer to a pin of the device that is intended to only provide information from the integrated circuit to an external interconnect; the term "bidirectional pin" is intended to refer to a pin of a device that is capable of either receiving or providing information to/from an external interconnect.

In FIG. 2, I/O pin SCL/SCLK of device 118 is connected to the SCL pin of devices 116, 117 via interconnect 191. Pin SDA/MOSI is connected to the SDA pin of devices 116, 117 via interconnect 192. Pins SA0/MISO and SA1/SS are both driven to a logic low, e.g., tied to ground.

In the particular embodiment illustrated FIG. 2, the I/O pins SA0/MISO and SA1/SS of device 118 are respectively tied either high or low when the serial communication bus 19 is configured in I2C mode to indicate logic states of two bits of the I2C slave address of device 18. In particular, SA0 and SA1 represent the two least significant slave address bits of device 118. Thus, assuming the other bits of the I2C slave address of device 118 are fixed, the device 118 can have one of four possible I2C slave addresses by virtue of asserting appropriate logic values at interconnects 193, 194. In the illustrated embodiment, both of the extra pins (SA0/MISO and SA1/SS) are driven to a logic low, e.g., tied to ground, to indicate the two least significant bits (SA0 and SA1) have values of zero.

In response to a reset event, such as start up, a state detect module 21 of device 118 determines a steady-state condition for at the pin SA0/MISO, and communicates this state to the serial communication module 41. By way of example, the steady state conditions that can occur at interconnect 193, which is connected to I/O pin SA0/MISO, include a logic HIGH signal state, a logic LOW signal state, or a high-impedance signal state, referred to herein as a HI-Z state. In response to the steady-state condition being either logic HIGH or a logic LOW, the serial communication module 41 will selectively implement the I2C protocol at the I2C/SPI port. As illustrated, the I/O pin of device 118 connected to interconnect 191 will operate as the I2C serial clock, the I/O pin connected to interconnect 192 will operate as the serial data pin, the I/O pin connected to interconnect 193 will operate to define the logic state of the least significant I2C slave address bit (SA0) of device 118, and the I/O pin connected to interconnect 194 will operate to define the logic state of the next least significant I2C slave address bit (SA1) of device 118. In response to the steady-state condition being the HI-Z state at the I/O pin SA0/MISO, the serial communication module 41 will selectively implement the SPI protocol at the I2C/SPI port connected to serial bus 19 as discussed below.

As used herein, high-impedance state is said to occur at an interconnect when there is not an output node driving the interconnect with a substantial amount of current as compared to the amount of current that would typically be provided to transition the interconnect between high and low logic states. A high-impedance signal can have a resistance of about 100 kilo-Ohms or higher, what will be appreciated, in certain embodiments that could be lower.

Figure 3:
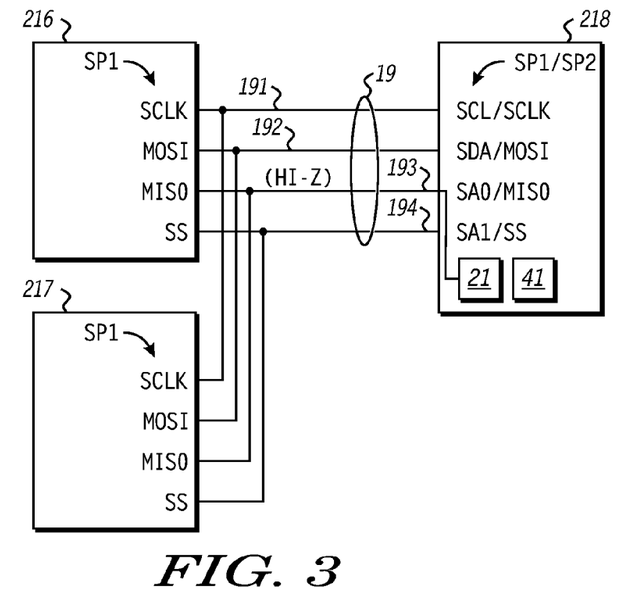
FIG. 3 illustrates a particular embodiment of the system device of FIG. 1.

FIG. 3 illustrates a particular embodiment of the present disclosure including data processors 216-218 that correspond to particular embodiments of data processors 16-18 of FIG. 1, respectively. Data processors 216, 217 are illustrated as supporting serial communications via SPI ports. Data processor 218 is similar to data processor 118 of FIG. 2, in that the data processor 218 can implement either the SPI protocol or the I2C protocol at its serial communications port SP1/SP2. In the embodiment illustrated at FIG. 3, it is presumed that device 216 is an SPI master device, and devices 217 and 218 will always be SPI slave devices. Thus, as illustrated in FIG. 3, I/O pin SCL/SCLK of device 218 is connected to the SCLK I/O pin of devices 216, 217 via interconnect 191, I/O pin SDA/MOSI of device 218 is connected to the MOSI I/O pin of devices 216, 217 via interconnect 192, I/O pin SA0/MISO of device 218 is connected to the MISO I/O pin of devices 216, 217 via interconnect 193, and I/O pin SA1/SS of device 218 is connected to the SS I/O pin of devices 216, 217 via interconnect 194. Note that I/O pin SA0/MISO is internally connected to the state detect module 21 of data processor 218 as will be discussed in greater detail below.

In response to the reset event, the configuration of FIG. 3 will result in the state detect module 21 determining that the steady-state condition at pin SA0/MISO is HI-Z. In response to detecting the HI-Z signal, data processor 218 will configure itself in as an SPI slave device with respect to the serial bus 19. It will be appreciated that while other I/O pins of the serial port SP1/SP2 can be connected to state detect module 21 to determine a steady-state condition, use of the I/O pin SA0/MISO can reduce the amount of logic needed between the data processing modules 216 through 218 in that during SPI mode device 218 the output of the SPI master 216 connected to interconnect 193 is in a high-impedance state and, therefore, does not drive a logic signal onto interconnect 193. The use of other I/O pins can require additional logic between the data processing modules 216 through 218.

Figure 4:
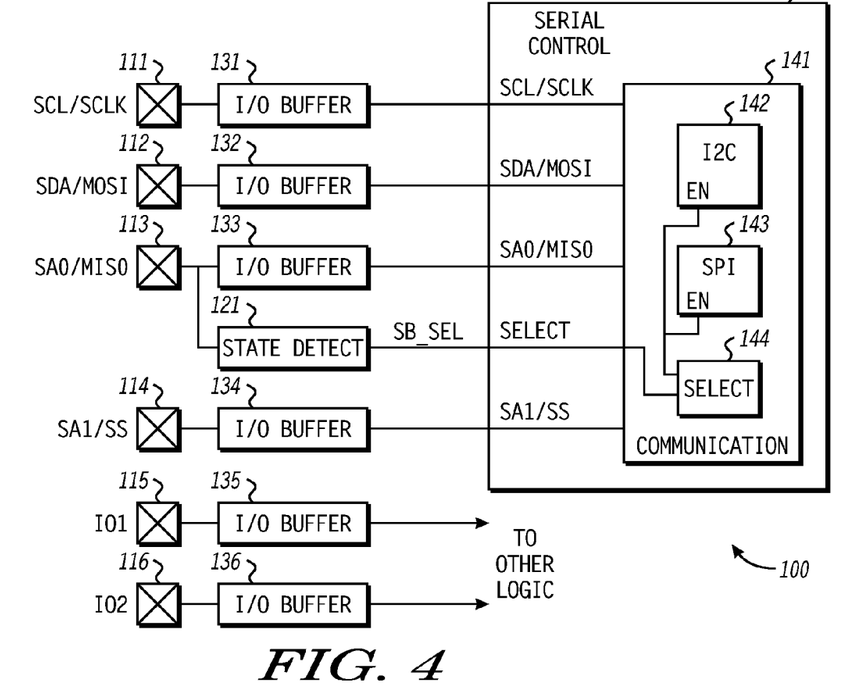
FIG. 4 illustrates a particular embodiment of portion of a device of FIG. 1 in greater detail.

FIG. 4 illustrates in greater detail a specific embodiment of a portion of the data processor device 18. In particular, FIG. 4 illustrates I/O pins 111-116 connected to corresponding I/O buffers 131-136, a state detect module 121 corresponding to module 21 of FIG. 1 connected to I/O pin 113, and a serial communication module 141 corresponding to module 41 of FIG. 1 connected to an output of the state detect module 121. The serial communication module 141 is further connected to the I/O buffers 131-134, and can be configured to implement one of plurality of serial communication protocols at I/O pins 111-114 via the I/O buffers 131-134. For example, as previously described, the serial communication port of device 18 can be configured to support either the I2C protocol or the SPI protocol. I/O pins 115, 116, and their corresponding I/O buffers 135, 136, are used to communicate other signals to and from the data processing device 18 that are not related to the serial communications protocols.

Serial communication module 141 includes a select module 144 that receives a select signal (SB_SEL) from the state detect module 121, an SPI interface module 143 that implements the SPI protocol, and an I2C interface module 142 that implements the I2C protocol. It will be appreciate that while these modules are illustrated as being physically separate, that in actuality they may be implemented at a common module that can be placed in one of SPI or I2C operating mode. In operation, the state of the SB_SEL signal used by the select module 144 to configure serial communications module 141 to support a particular protocol at the SP1/SP2 port. For example the state of SB_SEL can be used to enable one of the SPI interface module 143 or the I2C interface module 142.

The SPI interface module 143 implements the SPI protocol at the set of pins 111-114 when enabled. The I2C serial interface module 142 implements the I2C protocol at pins 111, 112 when enabled, and can implement optional functionality associated with the I2C of the set of pins 111-114, such as defining logic values of specific I2C slave address bits. Thus, in the specific embodiment illustrated, external logic signals provided to the pins 113, 114 will result in two bits of the I2C slave address of device 18 being defined in response to a reset event.

Figure 5:
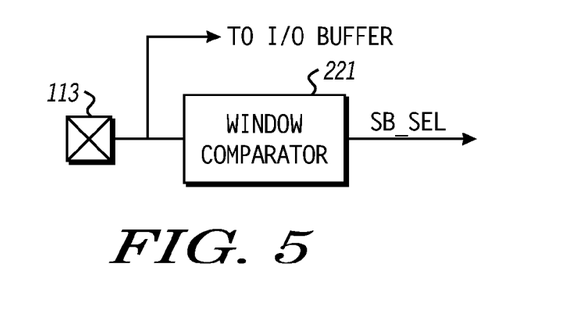
FIG. 5 illustrates a particular embodiment of a state detect module of FIG. 4.
Figure 6:
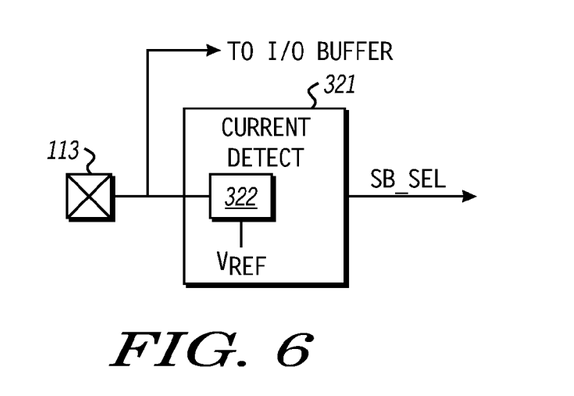
FIG. 6 illustrates a particular embodiment of a state detect module of FIG. 4.
Figure 7:
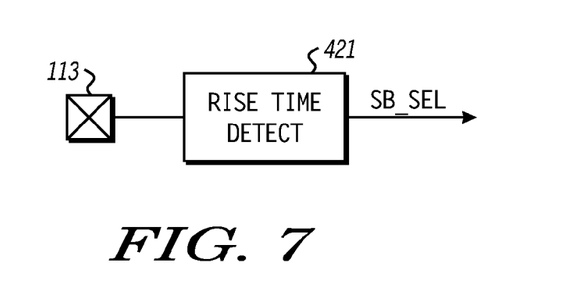
FIG. 7 illustrates a particular embodiment of a state detect module of FIG. 4.

FIGS. 5-7 illustrate block diagrams of particular embodiments of the state detect module 121 in accordance with the present disclosure. FIG. 5 illustrates a state detect module 221 implemented as a window comparator, which is illustrated in greater detail at FIG. 8. FIG. 6 illustrates a state detect module 321 implemented as a current detect module. According to this embodiment, a steady-state signal provided to the I/O pin 113 results in different current flowing that can be detected by the detect module 321 and communicated to the output of the detect module 321. For example, the interconnect signal SB_SEL can include two conductive nodes that provide one of the following two-bit logic values: 00b in response to a logic low state being present at I/O pin 113; 01b in response to a logic high state being present at I/O pin 113; and 1Xb, where X is either a one (1) or a zero (0) in response to a HI-Z state being present at I/O pin 113.

FIG. 7 illustrates a state detect module 421 implemented as a rise time detect module. According to this embodiment, a steady-state signal provided to the I/O pin 113 results in different rise or fall times occurring at the detect module 421. This difference in rise or fall time by the detect module 421 is detected and communicated to the output of the detect module 421. According to a particular embodiment, the rise time detect module 421 can include a weak pull-up or weak pull-down that is connected to the pin 113 that is detected by a sense amplifier (not shown).

Figure 8:
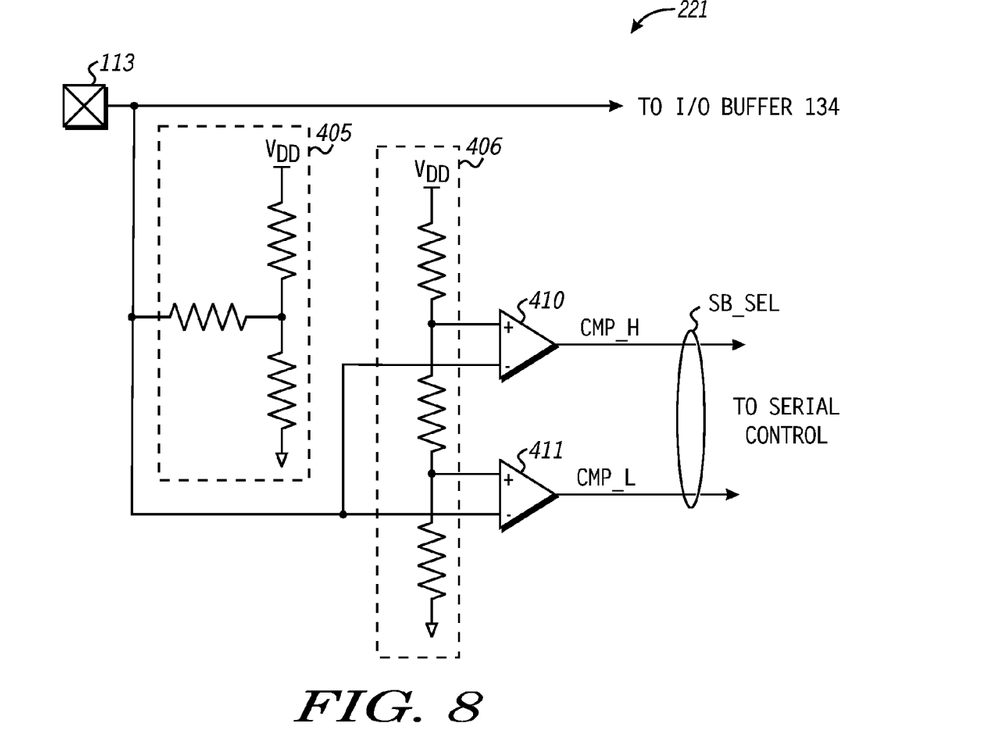
FIG. 8 illustrates a block and schematic diagram illustrating a particular embodiment of a state detect module.

FIG. 8 illustrates a specific embodiment of the window comparator 221 of FIG. 5. In particular, the I/O pin 113 is connected to a negative input terminal of a comparator 410 and to the negative input terminal of a comparator 411. A voltage divider 405 includes a first resistive element connected between VDD and a center terminal, and a second resistive terminal connected between the center terminal and ground. The center terminal is connected to the I/O pin 113 to bias the I/O pin 113 at a voltage between VDD and ground in response to a HI-Z signal. According to one embodiment, the divider circuit is a weak divider having an impedance of approximately 100 kilo-Ohms. The bias voltage is referred to herein as a midpoint voltage between these references, what will be appreciated, that the bias voltage need not be at a halfway point between VDD and ground. The center terminal is connected to the negative input terminal of comparator 410 and the negative input terminal of her 411.

A voltage divider 406 includes a first terminal connected to the positive input terminal of comparator 410 and a second terminal connected to the positive input terminal of comparator 410. According to a particular embodiment, the first terminal connected to comparator 410 provides a voltage that is greater than the midpoint voltage provided by voltage divider 405 and the second terminal connected to comparator 411 provides a voltage that is less than the midpoint voltage. Comparators 410 and 411 provide signals labeled CMP_H and CMP_L, respectively, which can have logic high or logic low states.

Figure 9:
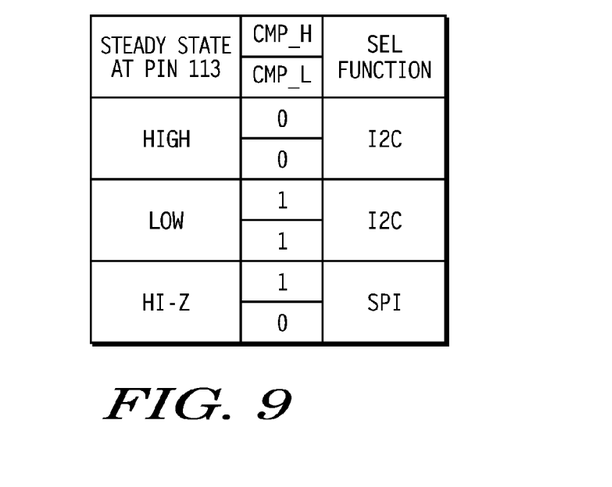
FIG. 9 illustrates a table indicative of a particular implementation of a state detect module as illustrated at FIG. 8.

The table of FIG. 9 illustrates the output logic states of signals CMP_H and CMP_L provided by the state detect module 121, e.g., the window comparator 221, based upon various steady-state logic conditions at input pin 113. In particular, a high logic state (HIGH) at input pin 113 results in comparators 410, 411 driving both signals CMP_H and CMP_L to low voltage (0) logic signals, respectively. A low logic state (LOW) at input pin 113 results in comparators 410, 411 driving both signals CMP_H and CMP_L to high voltage (1) logic signals, respectively. A HI-Z state (HI-Z) at input pin 113 results in comparators 410 driving signal CMP_H to a high voltage (1) logic signal, and comparator 411 driving signal CMP_L to a low voltage (0) logic signal.

In response to the select module 144 of FIG. 4 receiving a SB_SEL state of either 00b or 11b, which indicates the presence of the steady-state HIGH or LOW logic signal, the I2C module 142 is enabled (FIG. 2), wherein the serial communication module 141 implements the I2C protocol at the serial port of device 18. Otherwise, in response to the select module 144 of FIG. 4 receiving signal SB_SEL having a state of 10b, the SPI module 143 will be enabled, wherein the serial communication module 141 implements the SPI protocol at the serial ports of device 18.

Figure 10:
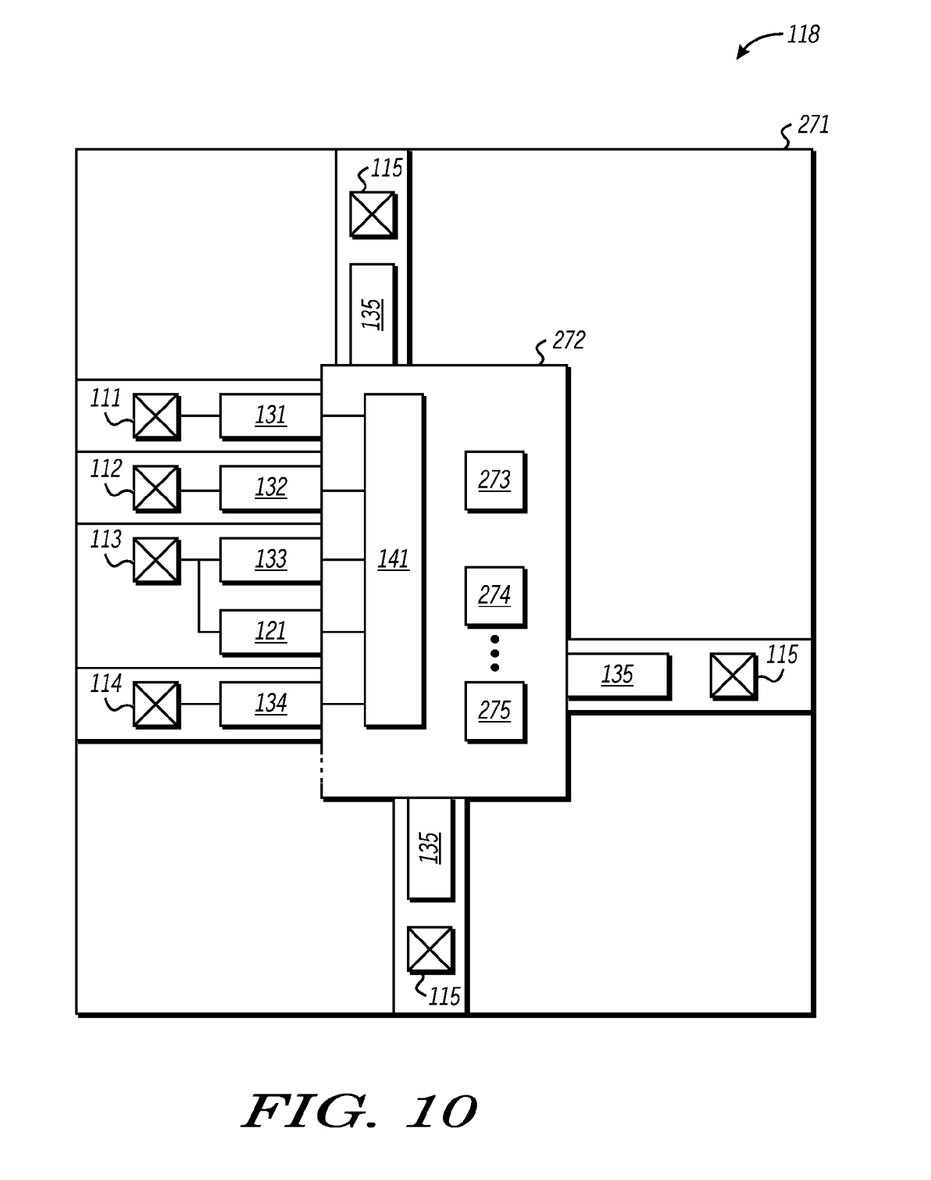
FIG. 10 is a block diagram representing physical layout of an integrated circuit die including portions of the device of FIG. 1.

FIG. 10 illustrates in block diagram form, a representation of an architectural layout of a device including various features described herein, and in particular FIG. 10 illustrates a die 118 corresponding to device 18 having a logic core defined by periphery 272 and an outer I/O region is defined by the annular region between by the outer-most periphery 271 of the die 118 and the outer-most periphery 272 of the logic core 272. The outer I/O peripheral region includes the I/O pins 111 through 113, I/O buffers 131 through 134, and the state detect module 121. In addition, the outer I/O peripheral region 271 will include other I/O pins 115 and I/O buffers 135.

The logic core 272 includes the serial communication module 141, and other functional blocks 273-275. The functional blocks 273-275 can include instruction-based data processors, memory, analog features, and the like. By placing the state detect module 121 and peripheral region 272, and providing a serial communications module 141 and that is capable of supporting multiple serial relocation protocols, it is possible to implement a serial communication port that will be configured upon reset in a manner that is transparent to an external device that requires a specific serial communication protocol.

Figure 11:
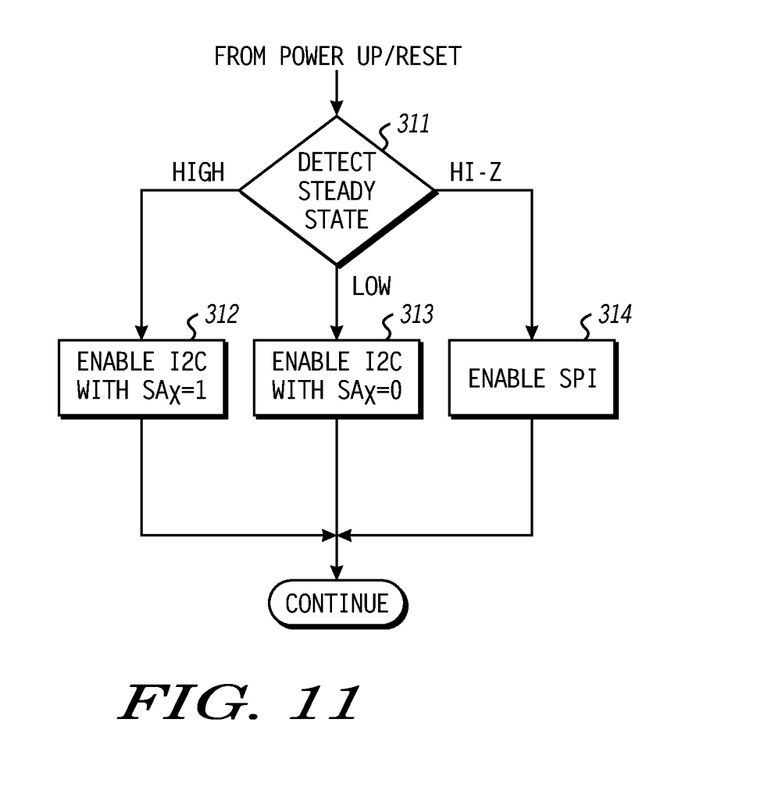
FIG. 11 illustrates a flow diagram in accordance with a method of a particular embodiment of the present disclosure.

FIG. 11 illustrates a flow diagram in accordance with a specific embodiment of the present disclosure. As a result of reset, such as during power-up, flow proceeds to decision block 311. At decision block 311 a steady-state condition is determined at an I/O pin of a data processor device. In accordance with particular embodiment, the steady-state condition can be a high-voltage condition, a low-voltage condition, a HI-Z condition, and the like. In response to the steady-state condition being a high-voltage condition, the flow proceeds to step 312 wherein the data processor configures a serial communication port in accordance with the I2C protocol, and the high-voltage signal is used to set a slave address bit SAx to a HIGH logic state. In response to the steady-state condition being a low-voltage condition, the flow proceeds to step 313 where the data processor configures the serial communication port in accordance with the I2C protocol, and the low-voltage signal is used to set the slave address bit SAx to a LOW logic state. In response to the steady-state condition being a HI-Z condition, the flow proceeds to step 314 where the data processor configures the serial communication port in accordance with the SPI protocol. According to the particular embodiment the I/O pin at which the steady-state condition is detected is one of the I/O pins of the SPI port. According to a particular embodiment, the I/O pin at which the steady-state condition is detected is the MISO pin of the SPI protocol.

In a first aspect, a method can include detecting, in response to a reset condition, a steady-state signal at an I/O pin of an integrated circuit die. The method can also include configuring, in response to the steady-state signal having a first steady state, a set of pins of the integrated circuit, including the I/O pin, as a first serial communication port that implements a first serial communication protocol, wherein the I/O pin is used to communicate with the first serial communication port, otherwise, in response to the steady-state signal having second steady state, configuring a second serial communication port at the integrated circuit that implements a second serial communication protocol, wherein the second serial communication port includes at least a portion of the set of pins.

In one embodiment of the first aspect, the first serial bus interface is a Serial Peripheral Interface (SPI) bus. In another embodiment, the second serial bus interface is an (Inter IC) I2C bus. In a further embodiment, the SPI bus is implemented as a three pin SPI bus. In another embodiment, the second serial bus interface is an (Inter IC) I2C bus. In an even further embodiment, the first I/O pin is a serial clock pin of the I2C bus. In still another embodiment, the first I/O pin is a serial data input of the I2C bus.

In another embodiment of the first aspect, the first steady-state signal indicates that a predetermined bit of an I2C slave address of the integrated circuit is a first binary logic state. In a particular embodiment, the second steady-state signal indicates that the predetermined bit of the I2C slave address of the integrated circuit is a second binary logic state opposite the first binary logic state. In an even more particular embodiment, one of the first steady-state signal and the second steady-state signal is a HI-Z steady state, and determining the first I/O pin is being driven to the HI-Z steady state includes detecting a voltage at a center terminal of a voltage divider of the integrated circuit, wherein a first resistive element of the voltage divider is coupled between the center node and first voltage, and a second resistive element the voltage divider is coupled between the center node and second voltage.

In a further embodiment of the first aspect, one of the first steady-state signal and the second steady-state signal is a HI-Z steady state, and determining the first I/O pin is being driven to the HI-Z steady state includes detecting a rise/fall time. In another embodiment, one of the first steady-state signal and the second steady-state signal is a HI-Z steady state, and determining the first I/O pin is being driven to the HI-Z steady state includes detecting a current flowing at the input. In still another embodiment, the first steady-state signal is a high-voltage logic state or a low-voltage logic state, and the second steady-state signal is a HI-Z steady state.

In a second aspect, a device can include a first serial interface module to implement a first serial communication protocol at a first set of I/O pins of the integrated circuit device, the first set of I/O pins including a first I/O pin and a second I/O pin, a second serial interface module to implement a second serial communication protocol at a subset of the first set of pins wherein the subset includes the first pin, a state detect module to determine a steady-state signal at the first I/O pin of an integrated circuit device, and a select module to enable the first interface module in response to the state detect module detecting a first steady state at the first pin, otherwise the select module to enable the second interface module in response to the state detect module detecting a second steady state at the first pin.

In one embodiment of the second aspect, the first serial communication protocol is the Serial Peripheral (SPI) protocol and the second serial communication protocol is the I2C protocol. In another embodiment, the first steady state is a HI-Z state. In still another embodiment, the device is an integrated circuit die includes an I/O peripheral region surrounding a logic core region, and the select module substantially resides in at the I/O peripheral region. In a particular embodiment, the first and second interface modules substantially reside at the logic core region.

In a third aspect, a method can include determining at an integrated circuit whether a first input/output (I/O) pin of an integrated circuit is being driven to a first steady signal state, a second steady signal state, or a third steady-state signal logic state, and in response to determining that the first I/O pin is being driven to either the first steady-state signal or to the second steady-state signal, configuring a set of I/O pins of the integrated circuit, that includes the first I/O pin, as a first serial bus interface that implements a first serial communication protocol, otherwise, in response to determining that the first I/O pin is being driven to the third steady-state signal, configuring at least a portion of the set of I/O pins as a second serial bus interface that implements a second serial communication protocol.

In one embodiment of the third aspect, the first steady-state signal is a logic zero steady state, the second steady-state signal is a logic one steady state, and the third steady state is a HI-Z steady state.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof. For example, it will be appreciated that more than one data processor can be a PCI bus master of the serial bus 19. For example, each one of the integrated circuits 16-18 can act as a bus master bus 19 in order to initiate communications between itself and another one of the integrated circuit devices. Furthermore, it will be appreciated that while the two lowest bits of the I2C slave address of processor 18 have been described as being defined by logic states driven at pins of the serial bus 19, it will be appreciated that in other embodiments that other I2C slave address bits can be defined by these pins. Alternatively, the extra pins need not be used to support serial bus communications protocols when device 118 is in I2C mode of operation.

The term "steady-state" as used herein is intended to refer to a signal having a characteristic that does not vary during a detection period. For example, signals held at a fixed voltage, such as VDD or ground, or at a high-impedance state (HI-Z) during a period of a reset event are a steady-state signals. Similarly, a signal having a fixed current value is a steady-state signal, a signal transitions between two values, e.g. Two voltages, in an always increasing or decreasing manner over a defined period of time is also a steady-state signal, as are signals that are transitioning between two values at a constant slew rate. For example, a signal transitioning from a low-voltage value via a pull-up resistor to a high-voltage value is considered a steady-state signal. Similarly, current signals having a fixed magnitude or a slew rate of a fixed magnitude are also considered a steady-state signal.

While the SPI port has been described as being implemented using all four pins as defined by the SPI protocol, it will be appreciated, that variations of the SPI protocol implemented using three pins can also be implemented. For example, in one embodiment the data processor 18 will be a slave device with respect to the SPI bus 19, and will only be used to receive information from a master; therefore, the SPI I/O pin MISO is not needed. In other embodiments, a variation of the SPI protocol that transmits and receives data over a single data pin could also be implemented.

In yet another embodiment, the state detect module 121 is connected to an I/O pin of device 18 that can be configured as the serial clock pin of the I2C bus, or to a serial data pin of the I2C bus. It will be appreciated that in such an implementation that logic can be added to a printed circuit board that includes both the master data processor 16 and the slave data processor 18 to ensure during reset, or coming out of reset, that appropriate signal states are maintained at the I/O pin connected to the state detect module 121. For example, logic can be added to ensure a high impedance signal is received at the state detect module 121 for the defined amount of time coming out of reset, and after this time the high impedance state can be removed to allow signals from other devices drive the interconnect.

In this document, relational terms such as "first" and "second", and the like, may be used solely to distinguish one entity or action from another entity or action without necessarily requiring or implying any actual such relationship or order between such entities or actions. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The term "another", as used herein, is defined as at least a second or more. The terms "including", "having", or any variation thereof, as used herein, are defined as comprising. The term "coupled", as used herein with reference to electro-optical technology, is defined as connected, although not necessarily directly, and not necessarily mechanically.

The terms "assert" or "set" and "negate" (or "deassert" or "clear") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

What is claimed is:

1. A method comprising:
    detecting an initial steady-state signal at an I/O pin of an integrated circuit die subsequent to a reset condition; and,
    configuring, in response to the initial steady-state signal having a first steady state, a set of pins of the integrated circuit, including the I/O pin, as a first serial communication port that implements a first serial communication protocol, otherwise, in response to the initial steady-state signal having second steady state, configuring a second serial communication port at the integrated circuit that implements a second serial communication protocol, wherein the second serial communication port includes at least a portion of the set of pins.

2. The method of claim 1, wherein the first serial communication protocol defines a Serial Peripheral Interface (SPI) bus.

3. The method of claim 2, wherein the second serial communication protocol defines an (Inter IC) I2C bus.

4. The method of claim 1, wherein the second serial communications protocol defines an (Inter IC) I2C bus.

5. The method of claim 4, wherein the first I/O pin defines a logic state of an I2C slave address of the integrated circuit die.

6. The method of claim 1, wherein in response to the initial steady-state signal having the first steady state further indicates that a predetermined bit of an I2C slave address of the integrated circuit die is a first binary logic state.

7. The method of claim 1, wherein one of the first steady state and the second steady state is a HI-Z state, and determining the first I/O pin is being driven to the HI-Z steady state comprises detecting a midpoint voltage of a voltage divider of the integrated circuit die.

8. The method of claim 1, wherein one of the first steady state and the second steady state is a HI-Z steady state, and determining the first I/O pin is being driven to the HI-Z steady state comprises detecting a rise/fall time.

9. The method of claim 1, wherein the first steady state is a high-voltage logic state or a low-voltage logic state, and the second steady-state is a HI-Z steady state.

10. A device comprising:
 a first serial interface module to implement a first serial communication protocol at a first set of I/O pins of an integrated circuit device, the first set of I/O pins including a first I/O pin and a second I/O pin;
 a second serial interface module to implement a second serial communication protocol at a subset of the first set of I/O pins wherein the subset includes the first pin;
 a state detect module to determine an initial steady-state signal at the first I/O pin of an integrated circuit device subsequent to a reset condition; and
 a select module to enable the first interface module in response to the state detect module detecting a first steady state at the first I/O pin, otherwise the select module to enable the second interface module in response to the state detect module detecting a second steady state at the I/O first pin.

11. The device of claim 10, wherein the first serial communication protocol is the Serial Peripheral (SPI) protocol and the second serial communication protocol is the I2C protocol.

12. The device of claim 10, wherein the first steady state is a HI-Z state.

13. The device of claim 10, wherein the device is an integrated circuit die comprising an I/O peripheral region surrounding a logic core region, and the select module substantially resides in at the I/O peripheral region.

14. The device of claim 13, wherein the first and second interface modules substantially reside at the logic core region.

15. The device of claim 10, wherein the state detect module comprises a window comparator.

16. The device of claim 15 wherein the window comparator comprises:
 a first comparator comprising a first input, a second input, and first output coupled to the select module to provide a select signal to enable one of the first interface module and the second interface module;
 a second comparator comprising a third input, a fourth input, and a second output;
 a first voltage divider comprising a first node coupled to provide a first voltage to the first I/O pin, to the first input of the first comparator, and to the third input of the second comparator; and
 a second voltage divider comprising a first node coupled to the second input of the first comparator, and a second node coupled to the fourth input of the second comparator.

17. The device of claim 10, wherein the state detect module comprises a current detector.

18. The device of claim 10, wherein the state detect module comprises a rise time detector.

19. A method comprising:
 determining at an integrated circuit whether, subsequent to a reset condition, a first input/output (I/O) pin of an integrated circuit is initially being driven to a first steady state, a second steady state, or a third steady state; and
 in response to determining that the first I/O pin is being driven to either the first steady state or to the second steady state, configuring a set of I/O pins of the integrated circuit, that includes the first I/O pin, as a first serial bus interface that implements a first serial communication protocol, otherwise, in response to determining that the first I/O pin is being driven to the third steady state, configuring at least a portion of the set of I/O pins as a second serial bus interface that implements a second serial communication protocol.

20. The method of claim 19, wherein the first steady state is a logic zero state, the second steady state is a logic one state, and the third steady state is a HI-Z state.

* * * * *